United States Patent [19]
Ishii et al.

[11] Patent Number: 5,725,916
[45] Date of Patent: *Mar. 10, 1998

[54] HEAT-INSULATING PAPER CONTAINER AND METHOD FOR PRODUCING THE SAME

[75] Inventors: Kenji Ishii; Tatsuya Koya, both of Chiba-ken, Japan

[73] Assignee: Nihon Dixie Company Limited, Tokyo, Japan

[*] Notice: The term of this patent shall not extend beyond the expiration date of Pat. No. 5,490,631.

[21] Appl. No.: 558,482

[22] Filed: Nov. 16, 1995

Related U.S. Application Data

[63] Continuation-in-part of Ser. No. 358,761, Dec. 19, 1994, Pat. No. 5,490,631.

[30] Foreign Application Priority Data

Sep. 26, 1995 [JP] Japan .................. 7-272023

[51] Int. Cl.⁶ .................................................. B65D 3/22
[52] U.S. Cl. .................. 428/34.2; 428/36.5; 428/159; 428/304.4; 206/524.2; 206/524.3; 206/524.6; 220/902; 220/417; 220/450; 220/454; 220/455; 220/457; 220/444; 229/400; 229/403
[58] Field of Search .................. 428/34.2, 36.5, 428/159, 304.4; 206/524.2, 524.3, 524.6; 220/902, 417, 450, 454, 455, 457, 444; 229/400, 403

[56] References Cited

U.S. PATENT DOCUMENTS

| | | | |
|---|---|---|---|
| 3,049,277 | 8/1962 | Shappell | 229/403 |
| 3,126,139 | 3/1964 | Schechter | 229/403 |
| 3,226,000 | 12/1965 | Poole et al. | 229/400 |
| 3,262,625 | 7/1966 | Russell et al. | 229/403 |
| 3,299,914 | 1/1967 | Harmon | 229/400 X |
| 3,329,306 | 7/1967 | Stein | 229/403 |
| 3,374,922 | 3/1968 | Shelby | 229/400 X |
| 3,471,075 | 10/1969 | Wolf | 229/400 |
| 3,976,795 | 8/1976 | Ande | 229/403 X |
| 4,435,344 | 3/1984 | Iioka | 264/45.1 |
| 4,965,029 | 10/1990 | Lidy et al. | 264/46.4 |
| 4,975,117 | 12/1990 | Tabayashi et al. | 106/22 |
| 5,118,532 | 6/1992 | Batson et al. | 427/278 |
| 5,330,565 | 7/1994 | Saitoh et al. | 106/20 R |
| 5,490,631 | 2/1996 | Iioka et al. | 229/403 |

FOREIGN PATENT DOCUMENTS

| | | |
|---|---|---|
| 48-32283 | 10/1973 | Japan . |
| 57-110439 | 7/1982 | Japan . |
| 6-99967 | 4/1994 | Japan . |
| 5-346302 | 12/1994 | Japan . |
| 6-284125 | 1/1995 | Japan . |

*Primary Examiner*—Charles Nold
*Attorney, Agent, or Firm*—Fay, Sharpe, Beall, Fagan, Minnich & McKee

[57] ABSTRACT

A heat-insulating paper container has a body member and a bottom panel member. Part of the outer surface of the body member is coated with a paint containing 5 wt %–40 wt % of a synthetic resin component so that the foaming of a thermoplastic synthetic resin film is suppressed in that area. The remainder of the body member which has not been coated with the resin component containing paint forms a foamed heat-insulating layer of the thermoplastic resin film.

10 Claims, 5 Drawing Sheets

HEAT-INSULATING PAPER CONTAINER AND METHOD FOR PRODUCING THE SAME

This application is a continuation-in-part application of U.S. application Ser. No. 08/358,761, filed Dec. 19, 1994, now U.S. Pat. No. 5,490,631.

BACKGROUND OF THE INVENTION

This invention relates to a heat-insulating paper container having a foamed layer of a thermoplastic synthetic resin film on the outer wall surface of the body member. More particularly, the invention relates to a paper container having a foamed heat-insulating layer that is suppressed in foaming in selected areas.

Several types of heat-insulating containers have been used commercially to pack hot liquids. A polystyrene foam heat-insulating container is one example. This is produced by a process comprising the addition of a foaming agent to polystyrene, casting the mixture into a mold, heating the resin under pressure to foam it, and removing the shaped article from the mold. The container thus produced has outstanding heat-insulating properties but, on the other hand, its design needs to be reconsidered from the viewpoint of saving petroleum resources or increasing the efficiency of incinerating waste containers. As a further problem, a curved printing press or a stamp printing press is required to print on the outer surfaces of polystyrene foam heat-insulating containers since printing can only be effected after individual cups have been shaped. Thus, the polystyrene foam containers have suffered the disadvantage of low printability.

Another type of heat-insulating paper containers are such that the outer side wall of the body member is entirely surrounded by a corrugated paper jacket. The process of manufacturing such a container involves additional steps of forming the corrugated paper jacket and bonding it to the outer surface of the side wall of the body member. This type of container has various other defects. First, letters, figures or other symbols are printed on the corrugated surface and the resulting deformed letters or patterns do not have good aesthetic appeal to consumers. Secondly, the jacket is bonded to the side wall of the body member in such a manner that only the valley ridges contact the side wall and the bond between the jacket and the side wall is so weak that the two will easily separate. Thirdly, containers having the corrugated jacket are not suitable for nesting and, hence, need a large area of storage.

Still another type of heat-insulating paper container has a "dual structure" wherein an inner cup is given a different taper than an outer cup to form a heat-insulating air layer in the space between the two cups. The two cups are made integral by curling their respective upper edges into a brim. Containers of this type have very good printability since the outer cup has a smooth-surfaced outer side wall. On the other hand, the two cups are prone to separation. A further defect is that the dual structure generally contributes to high manufacturing cost.

Unexamined Published Japanese Patent Application (kokai) Sho 57-110439, teaches a heat-insulating paper container consisting of a body member and a bottom panel member, characterized in that at least one surface of the body member is coated or laminated with a foamed heat-insulating layer of a thermoplastic synthetic resin film whereas the other surface of the body member is coated or laminated with a thermoplastic synthetic resin film, a foamed heat-insulating layer of said thermoplastic synthetic resin film or an aluminum foil. According to the teaching of this patent, the water in the paper is vaporized upon heating, causing the thermoplastic synthetic resin film on the surface to foam. The container under consideration has the advantage that it exhibits fairly good heat-insulating property and that it can be manufactured at low cost by a simple process.

This approach, however, has its own limitations due to the fact that the foaming of the thermoplastic synthetic resin film is solely dependent on the water content of the paper. First, the thermoplastic synthetic resin film will not foam adequately if the quality control of the paper is poor and if its water content is low; second, high water content is advantageous for the purpose of film foaming but, on the other hand, the mechanical strength of the container may deteriorate; thirdly, even if successful foaming is done, the thickness of the foam layer is uniform and cannot be adjusted from one portion to another.

Under the circumstances, the present inventors previously invented a heat-insulting paper container having a foamed layer that differed in thickness from one portion to another (see FIG. 4, in which the container is generally indicated at 1) and applied for patent on that invention in Japanese Patent Application No. Hei 5-346302, filed Dec. 22, 1993, which. As shown in FIG. 4, the container 1 consists basically of a body member 3 and a bottom panel member 5. The body member 3 has a printed area 9 provided on the outer surface by an organic solvent based ink near the brim 7 and the bottom panel member 5. The body member 3 also has a foamed heat-insulating layer 11 which entirely covers its outer surface including the printed areas 9. As shown, the foamed heat-insulating layer 11 over the printed areas 9 is thicker than the foamed heat-insulating layer 11 over the non-printed areas. The foamed heat-insulating layer 11 may typically be formed of a thermoplastic synthetic resin such as polyethylene.

However, this container has several disadvantages. First, to form the heat-insulating layer, the outer surface of the body member has to be foamed throughout but then it becomes undulated. With such containers, users (who are going to drink the liquid contents) may occasionally feel a "grainy" texture when their lower lip touches the part of a container which is immediately under the brim. Secondly, if the laminated thermoplastic synthetic resin film carries a POS bar code printed on the outer surface, the foaming of the film may deform or distort the bar code, thereby adversely affecting the accuracy of reading with a bar code reader. Thirdly, if a bar code is printed on the paper surface of the body member, the foaming of the film will reduce the sharpness of the bar code, thereby causing a reading error. In order to solve these problems, the present inventors filed Japanese Patent Application Hei 6-284125, in which they proposed that an unfoamed portion be provided in desired areas of the outer surface of the body member.

FIG. 5 illustrates a method of providing such an unfoamed area and it consists of providing at least one continuous or discontinuous slit 20 in a selected area of the film side where foaming is to be effected. The slit 20 is preferably deep enough to penetrate the film 10 to reach the paper 17. The function of the slits 20 is as follows: when water evaporates from within the heated paper, the vapor will escape to the air atmosphere via the slits 20, thereby preventing the film from being foamed in the area where the slits are cut, with the result that the unfoamed area 22 forms.

FIG. 6 illustrates another method of providing the unfoamed area. In the illustrated case, this is accomplished by coating a specified width of an anti-evaporation layer 70 in an area beneath the brim of the container. The anti-evaporation layer 70 will insure that the water in the paper and the solvent components of ink will not evaporate from the paper and it is desirably formed of water-vapor impermeable, aqueous coating materials that are capable of efficient film formation, as exemplified by KREHALON-TEX DO-818 of Kureha Chemical Industry Co., Ltd. and CLEARCOAT LA723-B1 of Hoechst Gosei K.K. As shown in FIG. 6, the laminated film lying above the anti-evaporation layer 70 coated on the paper surface 17 will not foam at all and retains its initial thickness. On the other hand, the film lying in areas where no such anti-evaporation layer is applied is foamed by the water in the paper to form a foamed heat insulating layer 11. The foaming action is particularly great in the film lying above the printed layer 9 since the solvents in the latter will accelerate foaming, and the resulting foamed, heat-insulating layer 11 is sufficiently thick.

As it turns out, however, these methods have their own problems. First, in order to implement the method of forming slits as shown in FIG. 5, special equipment and steps are required for cutting slits and this increases the manufacturing cost of containers. Second, the method of providing the anti-evaporation layer 70 (FIG. 6) requires that a paint for this layer be applied to the same area as where a design has been provided by printing and, as a result, the previously applied ink will redissolve in the solvent components of the paint to cause color fading. Thirdly, the anti-evaporation layer is made of a resin component, the primary objective of which is to suppress the foaming of the laminate film 10, so it tends to adhere only insufficiently to the surfacing film, causing the foam cells to move towards, rather than away from, the area where the paint has been applied. Fourthly, the paint which is applied to the already printed area increases the thickness of that area so greatly that uneven pressure will be exerted to cause "blocking" as the web is rewound on a take up roll.

SUMMARY OF THE INVENTION

An object, therefore, of the present invention is to provide a paper container having a foamed, heat-insulating layer, in which the foaming of selected areas has been suppressed by a positive and yet simple procedure.

This object of the invention can be attained by a heat-insulating paper container comprising a body member and a bottom panel member, characterized in that at least part of the outer surface of said body member is coated with a paint containing 5 wt %–40 wt % of a synthetic resin component and that the foaming of a thermoplastic synthetic resin film is suppressed in that area of the outer surface of said body member which has been coated with said resin component containing paint whereas a foamed heat-insulating layer of the thermoplastic synthetic resin film is provided in the other areas of the outer surface of said body member.

Thus, the heat-insulating paper container of the invention is characterized in that the area coated with the paint containing 5–40 wt % of a synthetic resin component is suppressed in foaming whereas a foamed, heat-insulating layer is provided in the other areas where the paint has not been applied. In other words, the paint containing 5–40 wt % of the synthetic resin component is capable of controlling the degree of foaming of the synthetic resin film laminated on the outer surface of the body member. Therefore, this paint may preliminarily be applied to those areas where the synthetic resin film is desirably left unfoamed, such as the area just beneath the brim of the container or the area to be provided with a bar code by printing and this is effective in forming the desired area which is suppressed in foaming.

DETAILED DESCRIPTION OF THE INVENTION

Figure 1:
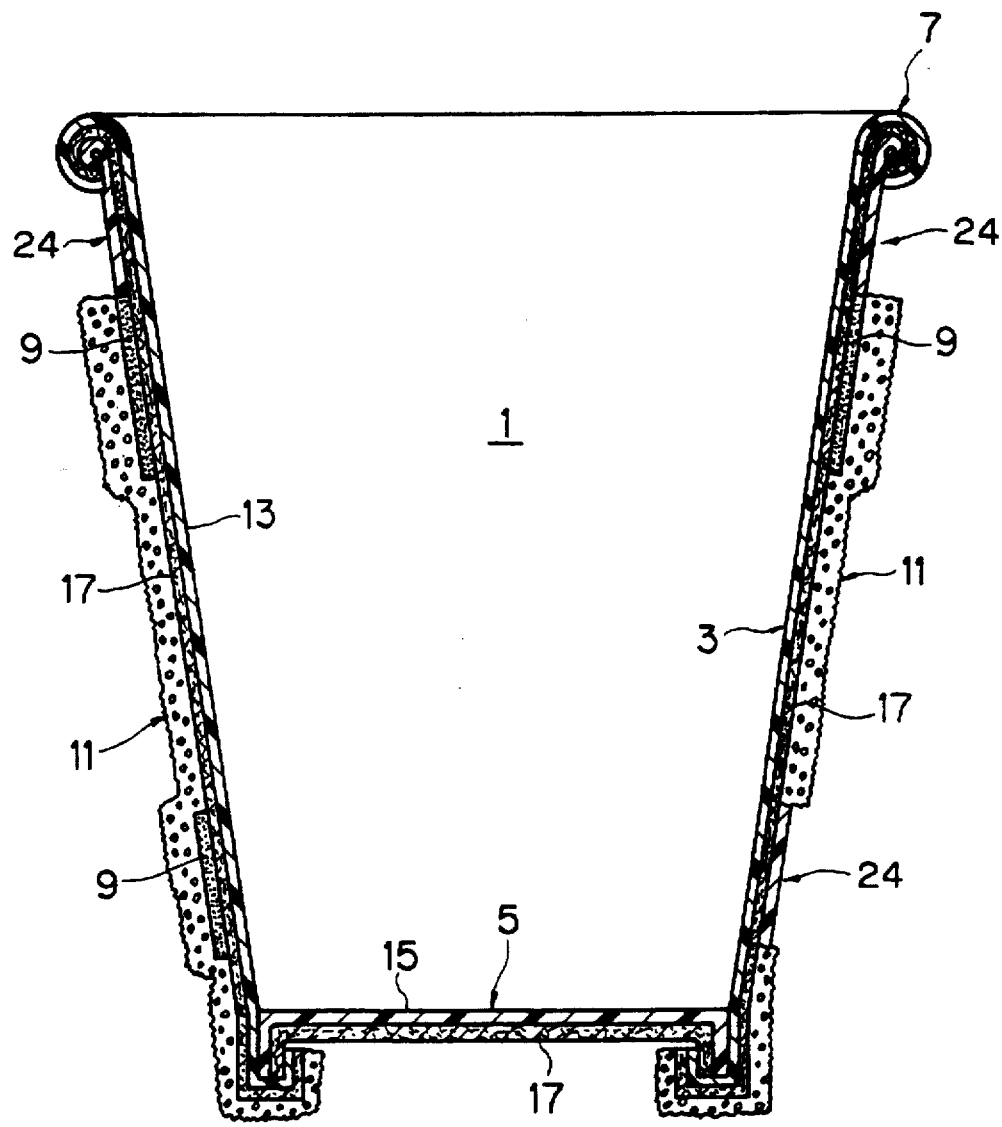
FIG. 1 is a simplified cross section of an example of the heat-insulating paper container of the invention which is foaming-suppressed in selected areas.

FIG. 1 is a simplified cross section of an example of the heat-insulating paper container of the invention. The container generally indicated by 1 consists basically of a body member 3 and a bottom panel member 5. The body member 3 has a synthetic resin containing paint coated on the outer surface in areas near the brim 7 and the bottom panel member 5 to provide foaming-suppressed portions 24. The container also has a foamed, heat-insulating layer 11 provided in different thicknesses in different areas to surround the entire part of the side wall of the body member 3. As shown, the foaming-suppressed portions 24 provided by the coating of the synthetic resin containing paint are much thinner than the foamed, heat-insulating layer 11.

The term "foaming-suppressed" as used herein means not only the state in which the thermoplastic synthetic resin film laminated on the outer surface of the body member is not foamed at all but also the state in which said film is foamed to such an extent that it will not cause any unpleasant feeling when the lower lip contacts the foaming-suppressed area or that the bar code printed in that area will not be read incorrectly. The amount of foaming that meets these requirements is generally less than 40% of complete foaming but to assure the reading of bar codes without errors, the degree of foaming is preferably no more than 30% of the complete foaming.

The inner surface of the body member 3 is covered with a film 13 which is made of either a thermoplastic synthetic resin such as polyethylene or an aluminum foil. The inner lining of the body member 3 is necessary both for preventing the penetration of liquid contents into the paper and for assuring that the water in the paper will not evaporate directly into the air atmosphere during heating of the fabricated container. Total loss of the water in the paper may potentially result in a failure to foam the thermoplastic synthetic resin film on the outer surface of the body member 3. The inner surface of the bottom panel member 5 is laminated with a thermoplastic resin 15 to attain the same purpose as just described above (preventing the permeation of liquids into the paper). Indicated by 17 is the paper sheet.

Figure 2:
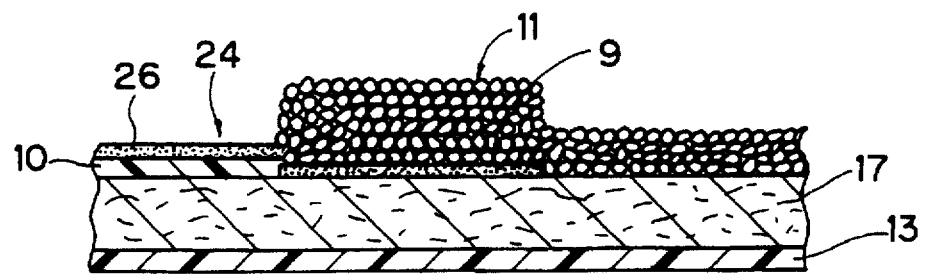
FIG. 2 is a diagrammatic partial enlarged cross section of an area of the container shown in FIG. 1 that is near one of the areas which are suppressed in foaming.

FIG. 2 is a partial enlarged cross section of the foaming suppressed portion 24 of the container shown in FIG. 1. The thermoplastic synthetic resin film 10 which is laminated on the outer surface of the body member 3 has a coating 26 formed in a selected area by application of the synthetic resin containing paint. The coating 26 effectively suppresses subsequent foaming of the underlying thermoplastic synthetic resin film 10, thereby providing the foaming-suppressed portion 24. The mechanism by which the synthetic resin containing coating 26 suppresses the foaming of the thermoplastic synthetic resin film 10 is speculated to be as follows. If the synthetic resin component of the coating 26 as applied over the surface of the film 10 is more heat-resistant than the latter, it will not expand during subsequent heating. In other words, the coating 26 fails to expand together with the film 10, which will crack or split, leaving no air pockets that are necessary for its foaming. Another important factor that should be considered is the concentration of the synthetic resin component of the foaming-suppressing paint. As its concentration increases, the strength of the resin coating also increases and if it is so strong that it will no longer expand together with the film 10, the latter again fails to foam.

Various synthetic resins may be incorporated in the paint for use in suppressing the foaming of the thermoplastic synthetic resin film laminated over the outer surface of the body member and they include, for example, alkyd/nitrocellulose mixtures, nitrocellulose, polyurethanes, a vinyl chloride/vinyl acetate mixture, aqueous polyacrylic resins, polyamide-based resins, chlorinated polyolefins, chlorinated polyolefin/rosin mixtures and solvent-containing acryl-based resins. These resins may be used either alone or in admixtures.

These resin components are incorporated in amounts ranging from 5 to 40 wt %, preferably from 10 to 30 wt %, of the total weight of the paint. If the resin content is less than wt %, the paint is so thin that not only considerable difficulty is encountered in coating operations but also the desired suppression of foaming cannot be accomplished. If the resin content is more than 40 wt %, the paint becomes so viscous that it cannot be transferred smoothly during application, particularly when this is done by rollers as in gravure coating and reverse roll coating. In addition, insufficient scraping with doctor blades or the clogging of sprays will occur and these also preclude the performance of efficient coating operations.

The paint used in the invention to suppress the foaming of the thermoplastic synthetic resin film contains solvents for the purpose of promoting the dispersion of the resin component and controlling the flow of the paint. When the paint is applied by gravure coating, the solvents assure smooth transfer of the paint onto the surface, thereby improving its "wettability". The solvents for the paint may be incorporated in such amounts that, when taken together with the resin component and any other additives (if any, such as pigments and various aids), they make a total of 100 wt %. Consider, for example, the case where neither pigments nor additives are used and the paint is solely composed of the resin component and a solvent; if the resin component is incorporated in amounts of 5–40 wt %, the solvent is incorporated in amounts of 95–60 wt %. The solvents may be either aqueous or organic or mixtures of aqueous and organic types. Exemplary solvents include water, acetone, methyl acetate, methyl ethyl ketone, isopropyl acetate, ethyl alcohol, dibutyl acetate, n-butyl acetate, isobutyl alcohol, toluene and xylene. If two or more of these solvents are to be used, compatibility with the resin component must be assured by attaining a good balance between solubility and wettability in consideration of the solubility parameter (SP). In practice, the ease of drying the applied coating must also be taken into account and, hence, the boiling points of the respective solvents and their relative evaporation rates are also important factors. With all these factors taken into consideration, two or more solvents may be selected as appropriate for combined use.

The coating weight of the synthetic resin containing paint is not limited to any particular value but it may generally range from $1.0 \text{ g/m}^2$ to $10 \text{ g/m}^2$, preferably from 2 to 7 $\text{g/m}^2$, on a dry weight basis. If the paint is applied in amounts within these ranges, a foam-suppressed coating 26 is provided which, after drying, has a thickness in the range from 1 µm to 10 µm. If the dry thickness of the coating 26 is less than 1 µm, the desired suppression of foaming is not achieved. If, on the other hand, the dry thickness of the coating 26 exceeds 10 µm, its foam suppressing effect is saturated and only economic disadvantages will result. The thickness of the coating 26 varies with the content of the synthetic resin in the paint. For example, the higher the content of the synthetic resin, the thinner the coating 26 that can be formed.

The method of applying the synthetic resin containing paint is not limited to any particular types and various applicators may be employed, such as knife coaters, spray coaters, kiss roll coaters, squeeze roll coaters, gravure coaters, reverse roll coaters, bar coaters, curtain coaters and air-knife coaters. The method of drying the applied paint also is not limited to any particular types and any well-known techniques may be employed, such as drying with cold or warm air.

The heat-insulating container of the invention can be fabricated by means of a conventional cup-forming machine. First, a paper sheet for making the container body member is unrolled and subjected to printing in desired areas. Bar codes and any other necessary information may be printed at this stage. Registering and other necessary printing jobs can be done by conventional means or procedures. In the next step, the thusly printed paper sheet is extrusion-laminated with a film of thermoplastic synthetic resin such as polyethylene. The other side (where no printing has been done) of the paper sheet is also laminated with a thermoplastic synthetic resin film or an aluminum foil. A paper sheet for making the bottom panel member is laminated with a thermoplastic synthetic resin film on one side only. Thereafter, the synthetic resin containing paint to be described below in detail is applied to specified areas of that side of the paper sheet which has been laminated with the thermoplastic synthetic resin film and which is to provide the outer surface of the body member. Alternatively, the synthetic resin containing paint may be applied onto selected areas of the outer surface of the body member after the latter has been assembled with the bottom panel member to fabricate a container. A blank is cut from each of the paper sheets. Using a conventional cup-forming machine, the two blanks are fabricated into a container with the blank for the body member being oriented in such a way that the areas coated with the synthetic resin containing paint will face outward whereas the blank for the bottom panel member is oriented in such a way that the film laminated side will face inward. The fabricated container is then subjected to a heat treatment. The thus produced heat-insulating paper container is generally indicated by 1 in FIG. 1 and it has not only a foamed, heat-insulating layer of varying thickness but is also suppressed in foaming in desired areas.

The method of providing a foamed, heat-insulating layer of varying thickness is disclosed in the specification of Japanese Patent Application Hei 5-346302. To provide a thick foamed, heat-insulating layer as in the case described above, an organic solvent based ink has to be preliminarily applied onto the paper sheet 17 to form a printed layer. The ink to be used in printing is not limited to any particular types but inks of such a type that very small amounts of solvent components will remain in the printed surface (more specifically, the paper) are preferred from the viewpoint of accelerated film foaming. Common ink solvents such as acetone, ethyl acetate, methanol, isopropyl alcohol, ethanol, toluene, xylene, methyl ethyl ketone, methyl isobutyl ketone, butanol, propylene glycol, monomethyl ether acetate, ethyl cellosolve, etc. may be used in admixture. To insure efficient foaming, small amounts of ink solvents should remain even after both surfaces of the body member have been laminated with thermoplastic synthetic resin films. Desirable from this viewpoint are inks that contain large amounts of toluene, methyl ethyl ketone, methyl isobutyl ketone and other solvents that are less prone to evaporation during drying on a printing press or at the stage of lamination with thermoplastic synthetic resin films. Such less vaporizing solvents are preferably contained in at least 10%, more preferably 20–50%. It should, however, be noted that the relative proportions of solvents must be determined in due consideration of printability since the ink containing those solvents is to be used for the printing purpose.

Thermoplastic synthetic resin films that may be used in the invention are typically formed of polyethylenes, polypropylenes, polyvinyl chlorides, polystyrenes, polyesters, nylons, etc. The film to be laminated on the outer surface of the body member 3 must have a lower softening point than the film to be laminated on the inner surface. Take, for example, the case of laminating both sides of the body member 3 with a polyethylene film; the film on the outer surface must be a low-density polyethylene and the film on the inner surface must be a medium- or high-density polyethylene.

The thickness of the film to be laminated on the body member 3 is not limited to any particular values but it should preferably have the necessary and sufficient thickness to form a desired thickness of foamed heat-insulating layer 11 by foaming the film laminated on the outer surface of the body member. Take, for example, the case of laminating a low-density polyethylene film on the outer surface of the body member 3; the thickness of this film is typically in the range from 25 to 60 μm. Thicker films may be used but then the underlying printed patterns are sometimes difficult to see through the films. The thickness of the film to be laminated on the inner surface of the body member 3 is not limited to any particular values as long as it is necessary and sufficient to ensure resistance to liquid permeation. The exact value of the thickness that meets this requirement is variable and can appropriately be determined by the skilled artisan in accordance with the specific type of film that is selected for use.

The paper sheet to be used in producing the heat-insulating container of the invention has preferably a basis weight in the range from 100 g/m$^2$ to 400 g/m$^2$. It is also preferred that the paper sheet has a water content within the range from about 3% to about 10%.

The heating temperature and time will vary with the type of the paper sheet and the thermoplastic synthetic resin film used; generally, the heating temperature varies from about 110° C. and the heating time varies from about 20 seconds to about 4 minutes. An optimal combination of heating temperature and time can appropriately be determined by the skilled artisan in accordance with the specific type of film used.

Any heating means such as hot air, electric heat or microwaves can be used. Heating by hot air or electric heat in a tunnel having transporting means such as a conveyor has the advantage of accomplishing mass production at low cost.

Needless to say, foaming-suppressed portions may also be provided on a paper container having a foamed, heat-insulating layer of a uniform thickness. A heat-insulating paper container of this type is disclosed in commonly assigned Unexamined Published Japanese Patent Application (kokai) Sho 57-110439, supra. It should particularly be noted that if a color pigment is incorporated in the synthetic resin containing paint, the latter can also be used as printing ink. Therefore, by using this ink to print letters, symbols and patterns on the surface of the laminated film, one can insure that foaming is suppressed in the printed areas after foaming the laminated film, with the printed letters, symbols and patterns remaining substantially the same as before the foaming was done. As a result, the printed letters, symbols and patterns can assure clear visibility without suffering from any defects such as deformation, distortion, blurring and pinholes.

The following examples are provided for the purpose of further illustrating the advantages of the heat-insulating container of the invention but are in no way to be taken as limiting.

EXAMPLE 1

Figure 3:
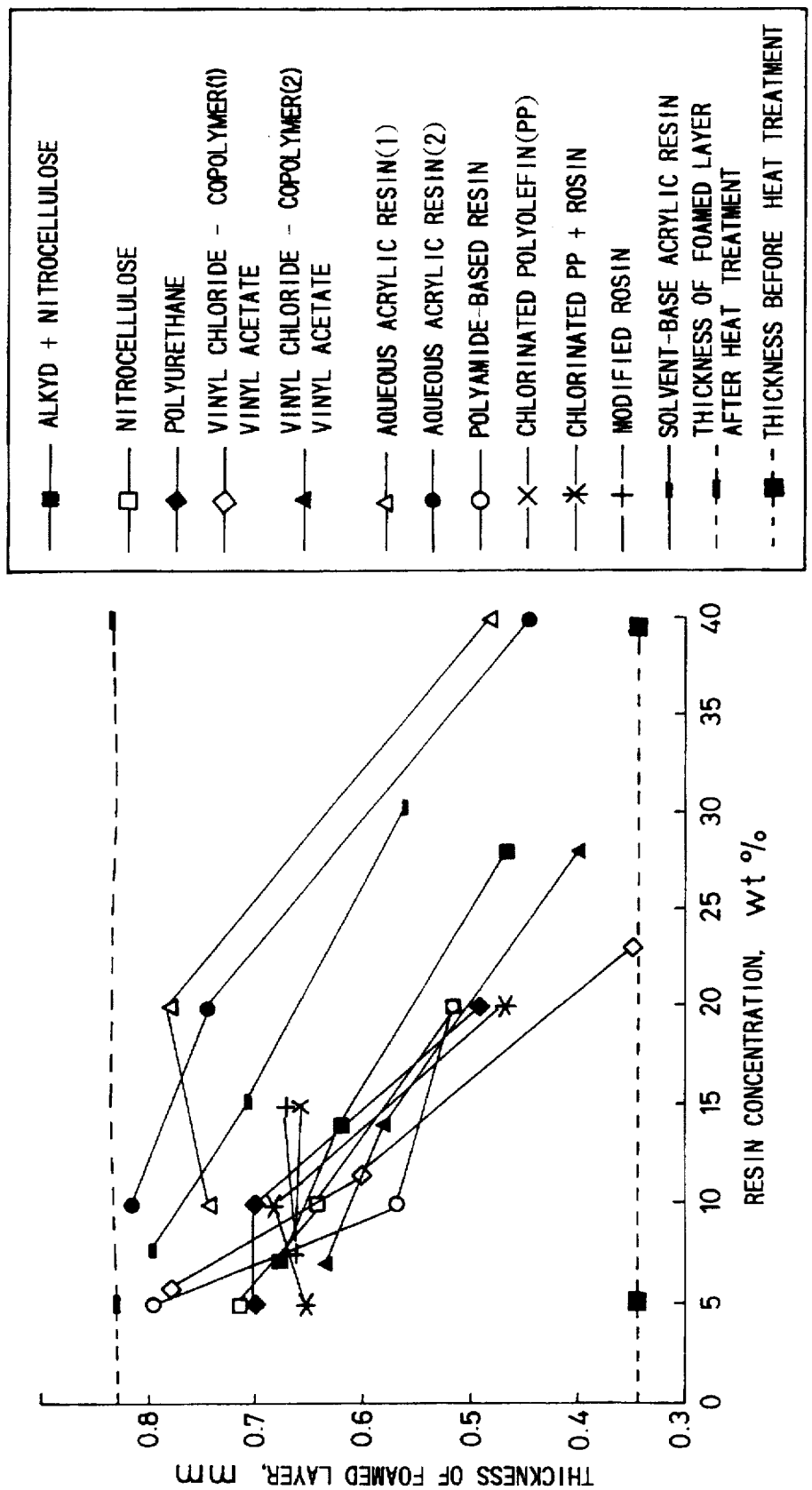
FIG. 3 is a characteristic diagram showing how the foaming of a synthetic resin film is affected by the type and concentration of the resin component in the foam suppressing paint.
Figure 4:
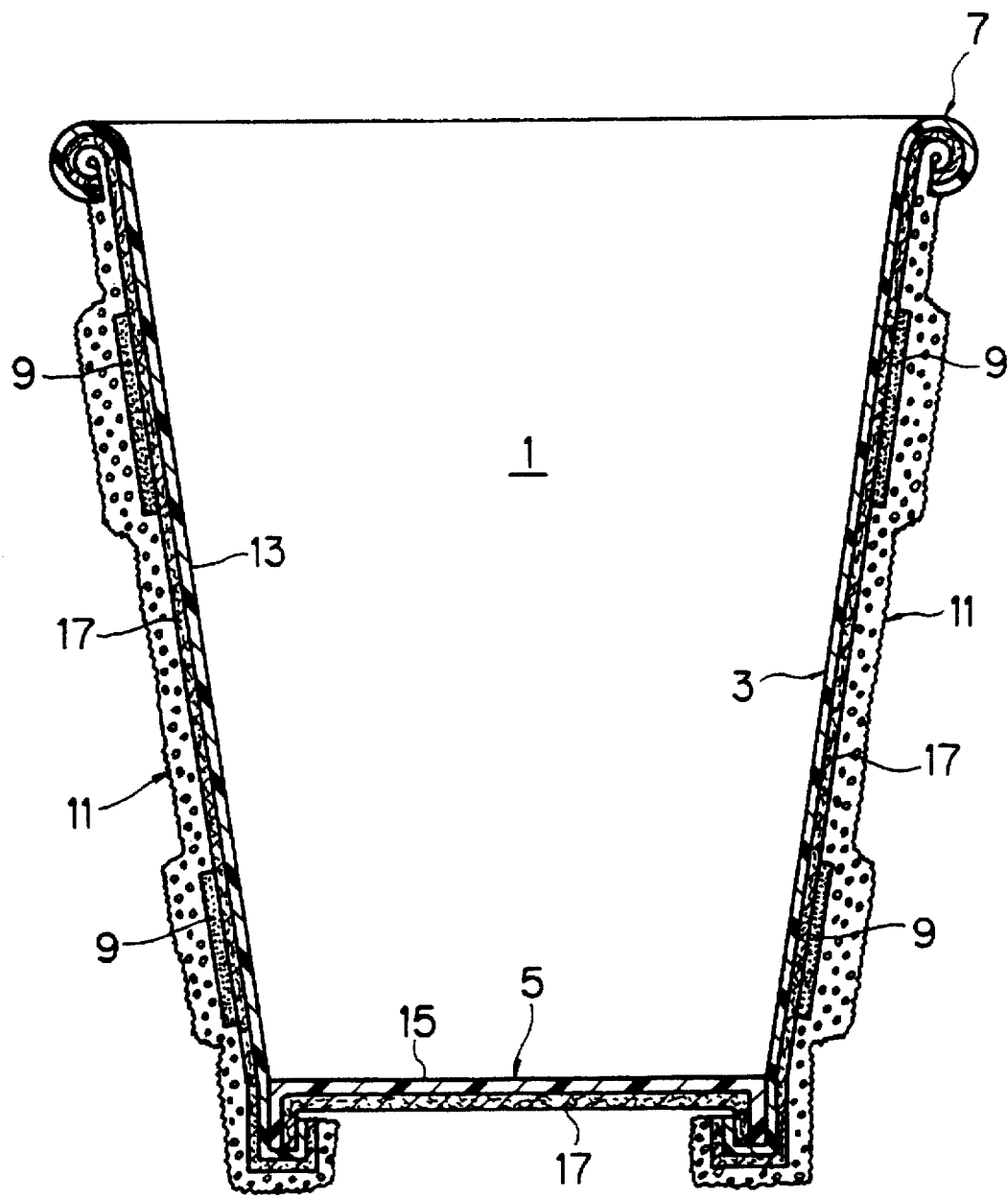
FIG. 4 is a diagrammatic cross section of an example of the heat-insulating paper container that has a foamed, heat-insulating layer of different thicknesses in different areas.
Figure 5:
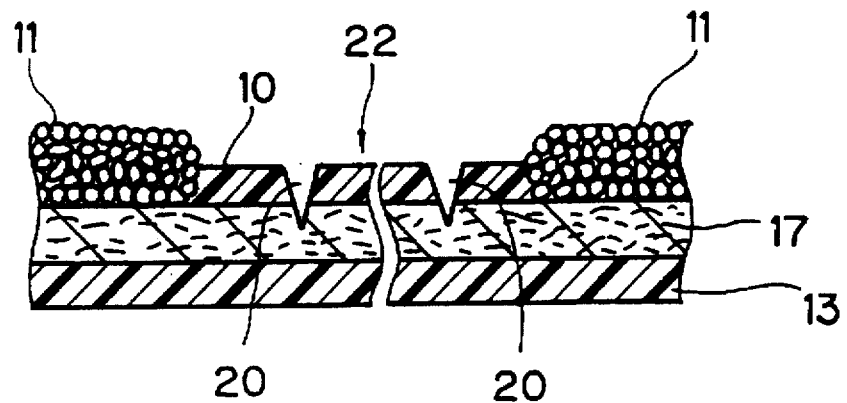
FIG. 5 is a diagrammatic cross section showing a method of providing unfoamed areas on the body of the container shown in FIG. 4.
Figure 6:
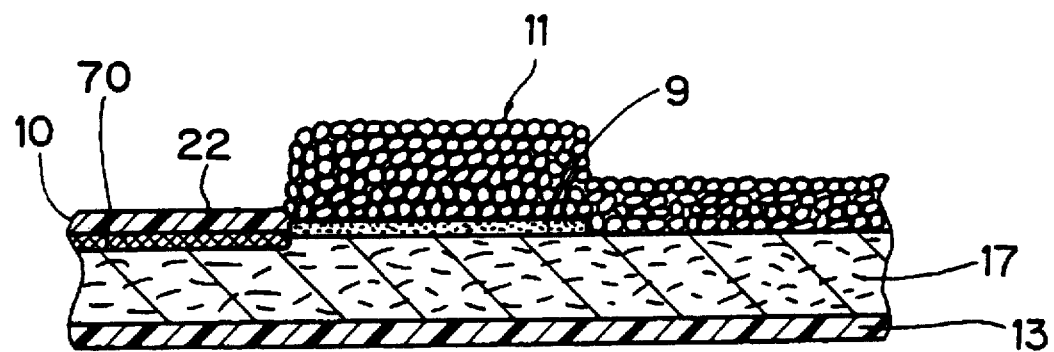
FIG. 6 is a diagrammatic cross section showing another method of providing unfoamed areas on the body of the container shown in FIG. 4.

A paper sheet having a basis weight of 230 g/m$^2$ (water content: 7.9%) was extrusion-laminated on one side with a low-density polyethylene in a thickness of 40 μm. The other side of the paper sheet was extrusion-laminated with a high-density polyethylene in a thickness of 20 μm. The side of the paper laminated with the low-density polyethylene film was coated with paints containing various synthetic resin components in concentrations ranging from 5 wt % to 40 wt %. The solvents were isopropyl alcohol, ethyl acetate, toluene and methyl ethyl ketone in respective proportions of 10:40:30:20 on a percent basis. The paper sheet laminated with polyethylene on both sides had an overall thickness of 0.340 mm. Sample pieces were blanked out of the two-side laminated paper sheet, put into a conveyor oven and heated at 120° C. for 120 sec. A foamed heat-insulating layer was provided only on the outer surface of the low-density polyethylene film lamination. Each sample piece had an overall thickness of 0.826 mm including the foamed heat-insulating layer. The relationship between the thickness of the foamed heat-insulating layer and each of the type and concentration of the specific synthetic resin component in the paint is shown in FIG. 3, from which one can understand that vinyl chloride/vinyl acetate base synthetic resins exhibited an outstanding foam-suppressing effect when they were used at concentrations within the range from 20 to 30 wt %. It is also clear from FIG. 3 that the other synthetic resins employed displayed the desired foam-suppressing effect at concentrations within the range from 10 to 40 wt %.

EXAMPLE 2

The synthetic resin containing, foam-suppressing paint of the invention was applied to the body member of a container in areas where bar codes were printed and after foaming the underlying film lamination, the bar codes were read with a bar code reader and the accuracy of reading was checked for varying degrees of foaming suppression. The experimental procedures were as follows.

Bar codes were printed in three sizes on a paper sheet having a basis weight of 230 g/m² (water content: 8.0%); the three sizes were large (1.5), medium (1.2) and small (the figures in parentheses represent the relative sizes of bar codes, with the size of the small bar code being taken as unity). One side of the paper sheet was then extrusion-laminated with a low-density polyethylene in a thickness of 60 μm. The other side of the paper sheet was extrusion-laminated with a high-density polyethylene in a thickness of 20 μm. The foam-suppressing paint used a vinyl chloride-vinyl acetate copolymer as the synthetic resin component, which was dispersed in a solvent system consisting of isopropyl alcohol (10%), ethyl acetate (40%), toluene (30%) and methyl ethyl ketone (20%). The paint was applied onto the film lamination in those areas of the sample paper sheet which were printed with bar codes; the concentration of the synthetic resin was varied at 30.0, 22.5, 15.0, 7.5, 3.8 and 1.9 wt %. For each concentration, 10 blanks were provided per sample and subjected to a heat treatment at 120° C. for 120 sec. Thereafter, the bar codes were read with a bar code reader and 10 readings were done for each blank to determine the accuracy of reading, which was evaluated by checking to see if the bar code could be read by a single scan with the bar code reader which was pressed against the bar code surface at such an angle that it was perpendicular as measured with the eye. The bar code reader was TBR-4000 of TOKEN, Ltd. The results are shown in Table 1 as they are related to the bar code size and the concentration of the synthetic resin component in the paint. The figures in Table 1 represent the number of correct readings that could be done when each sample was subjected to 100 scans with the bar code reader.

TABLE 1

| Bar code size | Concentration of Synthetic Resin, % | | | | | | |
|---|---|---|---|---|---|---|---|
| | 30.0 | 22.5 | 15.0 | 7.5 | 3.8 | 1.9 | Uncoated |
| Large (1.5) | 100 | 100 | 100 | 100 | 100 | 99 | 61 |
| Medium (1.2) | 100 | 100 | 100 | 100 | 100 | 90 | 18 |
| Small (1) | 100 | 100 | 100 | 100 | 91 | 39 | 2 |

When the film lamination was foamed without applying the synthetic resin containing foam-suppressing paint, the accuracy of reading with the bar code reader was as low as 61% even when the bar code was of the large size (1.5) and it decreased to 18% on the medium size (1.2); for the small size (1), the accuracy was 2%, which was equivalent to substantial illegibility. This result is entirely due to the presence of the foamed, heat-insulating layer in the area where the bar codes were printed. In contrast, the bar codes over which the synthetic resin containing foam-suppressing paint of the invention was coated could successfully be read irrespective of their size and 100% accuracy was assured in the resin concentration range from 30.0 wt % to 7.5 wt %.

Figure 7:
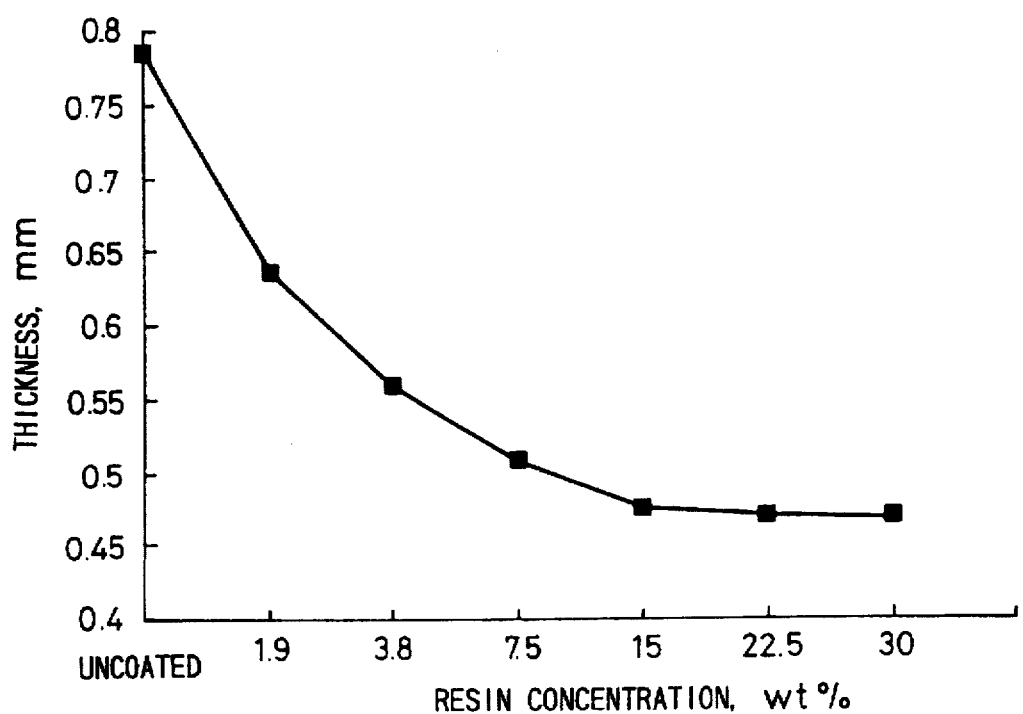
FIG. 7 is a characteristic diagram showing the relationship between the resin content of the foam-suppressing paint and the thickness of the foamed, heat-insulating layer.

FIG. 7 is a characteristic diagram showing the thickness of the foamed layer in the samples prepared under the conditions described in the preceding paragraph as it varied with the concentration of the resin component in the foam-suppressing paint. The sample having no coating of the foam-suppressing paint had an overall thickness of 0.786 mm including the foamed, heat-insulating layer. The thickness of the sample was 0.458 mm before foaming. As is clear from FIG. 7, the thickness of the foamed, heat-insulating layer decreased with the increasing concentration of the resin component. In other words, the foaming of the film lamination was suppressed more effectively as the concentration of the resin component in the paint increased.

Figure 8:
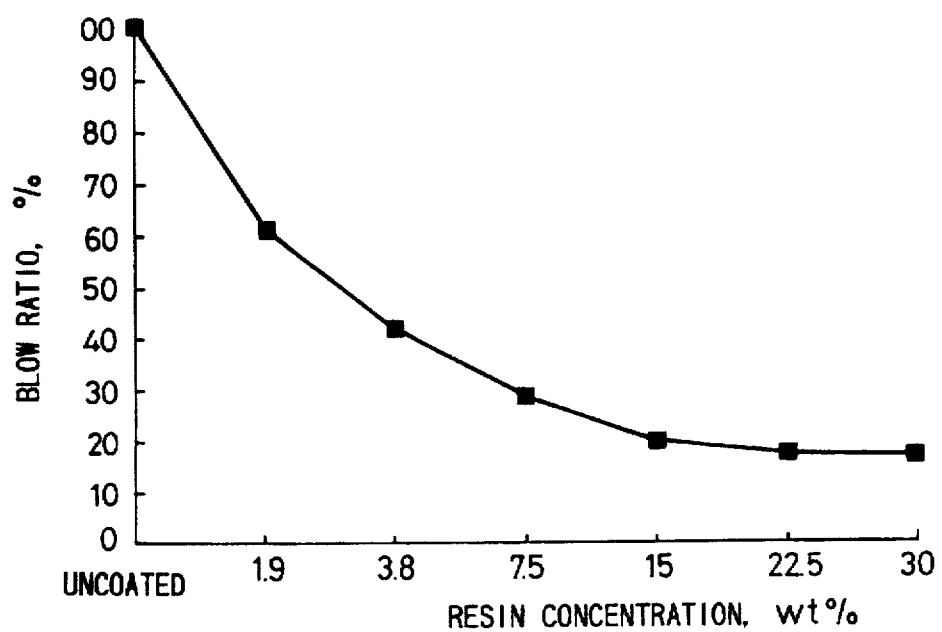
FIG. 8 is a characteristic diagram showing the relationship between the content of the resin component in the foam-suppressing paint and the blow ratio of the film.

The relationship between the concentration of the resin component and the blow ratio of the film lamination is shown in FIG. 8 on the basis of the data shown in FIG. 7. The blow ratio was expressed in relative terms, with the value for the non-application of the foam-suppressing paint being taken as 100% (=0.786 mm as the overall thickness of the sample including the foamed, heat-insulating layer). As Table 1 shows, when the resin content was 7.5 wt %, there occurred no errors in the reading of bar codes irrespective of their size and, according to FIG. 8, the blow ratio corresponding to the resin content of 7.5 wt % is 29%. It can therefore be concluded that in order to insure error-free bar code reading, the foaming of the film lamination must be suppressed to 30% and below of the complete level of foaming.

As described on the foregoing pages, the synthetic resin containing foam-suppressing paint of the invention is applied to selected areas of the body member of a container and this insures that even if the fabricated container is heated to foam the thermoplastic synthetic resin film laminated over the outer surface of the body member, the foaming of the film under the areas where the foam-suppressing paint has been applied can effectively be suppressed. As a result, bar codes and other pieces of information that are printed in areas under the coating of the paint can be read without any errors. If the paint is applied to the circumference of the area just beneath the brim of the container, the foaming of the film laminated in that area is sufficiently suppressed so that it will not cause any "grainy" feeling to be experienced by the lower lip in contact with that area but rather provide the same smooth feeling as experienced with a smooth-surfaced film surfaced film.

What is claimed is:

1. A heat-insulating paper container comprising a body member and a bottom panel member, wherein said body member has an inner surface that is laminated with one of an aluminum foil and a first thermoplastic synthetic resin film, and an outer surface of a second thermoplastic synthetic resin film, wherein at least a first part of the outer surface of said body member is coated with a foam suppressing paint containing 5 wt %–40 wt % of a synthetic resin component so that foaming of the second thermoplastic synthetic resin film is suppressed in an area of the outer surface of said body member that has been coated with said foam suppressing paint, and further wherein a heat-insulating layer of the second thermoplastic synthetic resin film is formed by foaming the second thermoplastic resin film in other areas of the outer surface of said body member.

2. A container according to claim 1, wherein the synthetic resin component of said foam suppressing paint is selected from the group consisting of alkyd-nitrocellulose copolymers, nitrocellulose, polyurethanes, a vinyl chloride-devinyl acetate copolymer, aqueous acrylic resins, polyamide-based resins, chlorinated polyolefins, chlorinated polyolefin-rosin copolymers and solvent-base acrylic resins and is contained in an amount of 10–30 wt % of the paint.

3. A container according to claim 2, wherein the synthetic resin component of said foam suppressing paint is a vinyl chloride-vinyl acetate copolymer.

4. A container according to claim 1, wherein said foaming-suppressed area is provided as a continuous band of a predetermined width beneath the brim of the container.

5. A container according to claim 1, further including a bar code printed in a selected area on the outer surface of the body member corresponding to said foaming-suppressed area.

6. A container according to claim 1, wherein said foam suppressing paint further contains an appropriate amount of at least one of a pigment and a color dye, such that a patterned portion is provided by printing with said paint in said foaming-suppressed area.

7. A container according to claim 1, wherein the foamed heat-insulating layer on the outer surface of the body member has a substantially uniform thickness.

8. A container according to claim 1, wherein the heat-insulating layer on the outer surface of the body member consists of a first thick portion and a second portion less thick than said first portion.

9. A container according to claim 8, wherein said first thick portion of the heat-insulating layer is provided in an upper half of the body member near a brim of the paper container.

10. A container according to claim 1, wherein said first thermoplastic synthetic resin film has a higher softening point than a softening point of said second thermoplastic synthetic resin film on the outer surface of the body member.

* * * * *